(12) United States Patent
Miyazaki

(10) Patent No.: US 11,416,593 B2
(45) Date of Patent: Aug. 16, 2022

(54) ELECTRONIC DEVICE, CONTROL METHOD FOR ELECTRONIC DEVICE, AND CONTROL PROGRAM FOR ELECTRONIC DEVICE

(71) Applicant: ASAHI KASEI KABUSHIKI KAISHA, Tokyo (JP)

(72) Inventor: Toshiyuki Miyazaki, Tokyo (JP)

(73) Assignee: Asahi Kasel Kabushiki Kaisha, Tokyo (JP)

( * ) Notice: Subject to any disclaimer, the term of this patent is extended or adjusted under 35 U.S.C. 154(b) by 765 days.

(21) Appl. No.: 16/348,701

(22) PCT Filed: Nov. 10, 2017

(86) PCT No.: PCT/JP2017/040621
§ 371 (c)(1),
(2) Date: May 9, 2019

(87) PCT Pub. No.: WO2018/088534
PCT Pub. Date: May 17, 2018

(65) Prior Publication Data
US 2019/0286799 A1    Sep. 19, 2019

(30) Foreign Application Priority Data
Nov. 11, 2016   (JP) .............................. JP2016-220458

(51) Int. Cl.
*G06F 21/00*      (2013.01)
*G06F 21/32*      (2013.01)
(Continued)

(52) U.S. Cl.
CPC ................ *G06F 21/32* (2013.01); *G06F 3/16* (2013.01); *G06F 16/243* (2019.01);
(Continued)

(58) Field of Classification Search
CPC .......... G06F 21/32; G06F 3/16; G06F 16/243; G06F 16/2477; G06F 16/686;
(Continued)

(56) References Cited

U.S. PATENT DOCUMENTS 9,972,318 B1 *   5/2018  Kelly ...................... G10L 15/26
10,027,662 B1 *   7/2018  Mutagi ............... H04L 63/0861
(Continued)

FOREIGN PATENT DOCUMENTS

JP   H11-066006 A   3/1999
JP   2000-080828 A   3/2000
(Continued)

OTHER PUBLICATIONS

International Search Report issued in corresponding International Patent Application No. PCT/JP2017/040621 dated Jan. 30, 2018.
(Continued)

*Primary Examiner* — Jeffrey C Pwu
*Assistant Examiner* — William A Corum, Jr.
(74) *Attorney, Agent, or Firm* — Morgan, Lewis & Bockius LLP

(57) ABSTRACT

The present disclosure provides an electronic device, a control method therefor, and a control program therefor capable of preventing an operation for activating a function protected by user authentication from becoming complicated. An electronic device includes: a keyword management DB for storing identification information of a registrant and a registered keyword in association with each other; a command management DB for storing a command and required authentication scores in association with each other; a data generator for creating grammar data including a registered keyword and a command; an utterance recognizer for matching the grammar data and extracted data extracted from an utterance of a user and acquiring a
(Continued)

recognized authentication score and a recognized command; and an authenticator for determining that the command is recognized by comparing the required authentication score associated with the command determined to be the same as the recognized command and the recognized authentication score.

17 Claims, 7 Drawing Sheets

(51) Int. Cl.
    *G06F 16/242* (2019.01)
    *G06F 16/2458* (2019.01)
    *G06F 16/68* (2019.01)
    *G10L 17/02* (2013.01)
    *G10L 17/06* (2013.01)
    *G10L 15/00* (2013.01)
    *G10L 17/00* (2013.01)
    *G06F 3/16* (2006.01)

(52) U.S. Cl.
    CPC ........ *G06F 16/2477* (2019.01); *G06F 16/686* (2019.01); *G10L 15/00* (2013.01); *G10L 17/00* (2013.01); *G10L 17/02* (2013.01); *G10L 17/06* (2013.01)

(58) Field of Classification Search
    CPC ......... G10L 15/00; G10L 17/00; G10L 17/02; G10L 17/06; G10L 15/19; G10L 2015/223; G10L 15/22
    See application file for complete search history.

(56) References Cited

U.S. PATENT DOCUMENTS

| | | | |
|---|---|---|---|
| 2008/0172230 A1* | 7/2008 | Hayakawa | G10L 17/14 704/E17.001 |
| 2010/0057443 A1* | 3/2010 | Di Cristo | G06F 16/3329 704/9 |
| 2012/0245941 A1 | 9/2012 | Cheyer | |
| 2015/0081295 A1 | 3/2015 | Yun et al. | |
| 2016/0119338 A1 | 4/2016 | Cheyer | |
| 2018/0007060 A1* | 1/2018 | Leblang | G06F 21/35 |
| 2018/0096678 A1* | 4/2018 | Zhou | G10L 15/22 |
| 2019/0012449 A1 | 1/2019 | Cheyer | |

FOREIGN PATENT DOCUMENTS

| | | |
|---|---|---|
| JP | 2000-099076 A | 4/2000 |
| JP | 2002-149181 A | 5/2002 |
| JP | 2003-228395 A | 8/2003 |
| JP | 2007-140048 A | 6/2007 |
| JP | 2008-257566 A | 10/2008 |
| JP | 2015-200913 A | 11/2015 |
| JP | 2016-129011 A | 7/2016 |
| WO | 2015/038435 A1 | 3/2015 |

OTHER PUBLICATIONS

International Preliminary Report on Patentability dated May 14, 2019, issued in corresponding International application No. PCT/JP2017/040621.

* cited by examiner

FIG. 3

| USER ID | FEATURE AMOUNT TIME-SERIES |
|---|---|
| 1 | TIME-SERIES DATA A1 |
| 1 | TIME-SERIES DATA B1 |
| 2 | TIME-SERIES DATA A2 |
| 3 | TIME-SERIES DATA A3 |

FIG. 4

| COMMAND | REQUIRED AUTHENTICATION SCORE |
|---|---|
| ILLUMINATION LIGHTING | 20 |
| RECEIVED CALL HISTORY | 80 |
| VOICE MEMO PLAY | 80 |
| MUSIC PLAY | 40 |

FIG. 6

| NUMBER | GRAMMAR DATA |
|---|---|
| 1 | 1/TIME-SERIES DATA A1/ILLUMINATION LIGHTING |
| 2 | 1/TIME-SERIES DATA A1/RECEIVED CALL HISTORY |
| 3 | 1/TIME-SERIES DATA A1/VOICE MEMO PLAY |
| 4 | 1/TIME-SERIES DATA A1/MUSIC PLAY |
| 5 | 1/TIME-SERIES DATA B1/ILLUMINATION LIGHTING |
| 6 | 1/TIME-SERIES DATA B1/RECEIVED CALL HISTORY |
| 7 | 1/TIME-SERIES DATA B1/VOICE MEMO PLAY |
| 8 | 1/TIME-SERIES DATA B1/MUSIC PLAY |
| 9 | 2/TIME-SERIES DATA A2/ILLUMINATION LIGHTING |
| 10 | 2/TIME-SERIES DATA A2/RECEIVED CALL HISTORY |
| 11 | 2/TIME-SERIES DATA A2/VOICE MEMO PLAY |
| 12 | 2/TIME-SERIES DATA A2/MUSIC PLAY |
| 13 | 3/TIME-SERIES DATA A3/ILLUMINATION LIGHTING |
| 14 | 3/TIME-SERIES DATA A3/RECEIVED CALL HISTORY |
| 15 | 3/TIME-SERIES DATA A3/VOICE MEMO PLAY |
| 16 | 3/TIME-SERIES DATA A3/MUSIC PLAY |

| COMMAND | USER ID | REQUIRED AUTHENTICATION SCORE |
|---|---|---|
| MUSIC PLAY | 1 | 40 |
| | 2 | 60 |
| VOICE MEMO PLAY | 1 | 80 |
| | 2 | 40 |
| ILLUMINATION LIGHTING | 1 | 20 |
| | 2 | 20 |
| RECEIVED CALL HISTORY | 1 | 80 |
| | 2 | 40 |

ELECTRONIC DEVICE, CONTROL METHOD FOR ELECTRONIC DEVICE, AND CONTROL PROGRAM FOR ELECTRONIC DEVICE

TECHNICAL FIELD

The present invention relates to an electronic device, a control method for the electronic device, and a control program for the electronic device.

BACKGROUND ART

In order to secure security in an electronic device such as a smartphone which is owned by a person, a method of performing unlocking by user authentication such as password input or fingerprint authentication and then activating an application manually or by a voice command, is used. For example, PTL 1 discloses that user authentication is performed by comparing an input voice and a text-independent voice print and a user access to a function of a device is allowed when the user authentication is normally performed.

Although various applications are provided in an electronic device, security levels required for such applications vary. For example, for an application of handling personal information such as an address book, high security is required. On the other hand, for an application for confirming the time, an application for lighting an illumination device, or the like, a security level lower than that of an application including personal information is sufficiently used.

In addition, in a device shared by a plurality of users, such as a device for household use, desired security levels for activating applications may be different for each user. An voice operation is one useful method of performing a simple operation of an electronic device. However, when performing speaker authentication by unlocking user authentication and then subsequently uttering independent voice commands for activating an application, there is a problem that the operation becomes complicated.

CITATION LIST

Patent Literature

PTL 1: JP 2016-129011 A

SUMMARY OF INVENTION

Technical Problem

An object of the present invention is to provide an electronic device, a control method for the electronic device, and a control program for the electronic device capable of preventing an operation for activating a function protected by user authentication from becoming complicated.

Solution to Problem

In order to achieve the above object, according to one aspect of the present invention, there is provided an electronic device including: a keyword storage configured to store identification information for identifying a registrant and a registered keyword based on an utterance of the registrant in association with each other; a command storage configured to store a plurality of required authentication scores correlated with the identification information different from each other in association with one command, and store a command for specifying an operation content and the required authentication scores to be used for determining whether or not to execute an operation specified by the command in association with each other; a data generator configured to generate grammar data including a registered keyword acquired from the keyword storage and a command acquired from the command storage; an utterance recognizer configured to match the grammar data generated by the data generator and extracted data extracted from an utterance of a user, and acquire a recognized authentication score indicating a matching degree between the registered keyword included in the grammar data and a part of the extracted data and a recognized command recognized from at least a part of a remaining part of the extracted data; an authenticator configured to determine, in a case where the required authentication score associated with the command determined to be the same as the recognized command acquired by the utterance recognizer is equal to or lower than the recognized authentication score acquired by the utterance recognizer, that the command is recognized and determine that the command is not recognized in a case where the required authentication score is higher than the recognized authentication score and output determination signal; and a controller configured to activates a component that executes an operation related to the recognized command when the determination signal indicating that the recognized command is recognized is input.

In addition, in order to achieve the above object, according to another aspect of the present invention, there is provided a control method for an electronic device including: causing a keyword storage to store identification information for identifying a registrant and a registered keyword based on an utterance of the registrant in association with each other; causing a command storage to store a plurality of required authentication scores correlated with the identification information different from each other in association with one command, and store a command for specifying an operation content and the required authentication scores to be used for determining whether or not to execute an operation specified by the command in association with each other; causing a data generator to generate grammar data including a registered keyword acquired from the keyword storage and a command acquired from the command storage; causing an utterance recognizer to match the grammar data generated by the data generator and extracted data extracted from an utterance of a user, and acquire a recognized authentication score indicating a matching degree between the registered keyword included in the grammar data and a part of the extracted data and a recognized command recognized from at least a part of a remaining part of the extracted data; and causing an authenticator to determine, in a case where the required authentication score associated with the command determined to be the same as the recognized command acquired by the utterance recognizer is equal to or lower than the recognized authentication score acquired by the utterance recognizer, that the command is recognized and determine that the command is not recognized in a case where the required authentication score is higher than the recognized authentication score.

In addition, in order to achieve the above object, according to still another aspect of the present invention, there is provided a control program for an electronic device causing a computer to function as: a keyword storage configured to store identification information for identifying a registrant and a registered keyword based on an utterance of the registrant in association with each other; a command storage configured to store a plurality of required authentication scores correlated with the identification information different from each other in association with one command, and store a command for specifying an operation content and the required authentication scores to be used for determining whether or not to execute an operation specified by the command in association with each other; a data generator configured to generate grammar data including a registered keyword acquired from the keyword storage and a command acquired from the command storage; an utterance recognizer configured to match the grammar data generated by the data generator and extracted data extracted from an utterance of a user, and acquire a recognized authentication score indicating a matching degree between the registered keyword included in the grammar data and a part of the extracted data and a recognized command recognized from at least a part of a remaining part of the extracted data; and an authenticator configured to determine, in a case where the required authentication score associated with the command determined to be the same as the recognized command acquired by the utterance recognizer is equal to or lower than the recognized authentication score acquired by the utterance recognizer, that the command is recognized and determine that the command is not recognized in a case where the required authentication score is higher than the recognized authentication score.

Advantageous Effects of Invention

According to one aspect of the present invention, it is possible to prevent an operation for activating a function protected by user authentication from becoming complicated.

BRIEF DESCRIPTION OF DRAWINGS

FIG. 3 is a diagram illustrating a database structure of a keyword management DB 14 provided in the electronic device 1 according to an embodiment of the present invention;

FIG. 4 is a diagram illustrating a database structure of a command management DB 15 provided in the electronic device 1 according to an embodiment of the present invention;

FIG. 6 is a diagram illustrating a database structure of a grammar data storage 166 of the data generator 16 provided in the electronic device 1 according to an embodiment of the present invention and a data structure of grammar data;

DESCRIPTION OF EMBODIMENTS

An electronic device, a control method for the electronic device, and a control program for the electronic device according to an embodiment of the present invention will be described with reference to FIGS. 1 to 10. First, a schematic configuration of the electronic device 1 according to the present embodiment will be described with reference to FIGS. 1 to 9. The electronic device 1 according to the present embodiment is, for example, a household robot, a portable device such as a smartphone, a mobile phone, a tablet personal computer, or a notebook personal computer, or a stationary personal computer.

Figure 1:
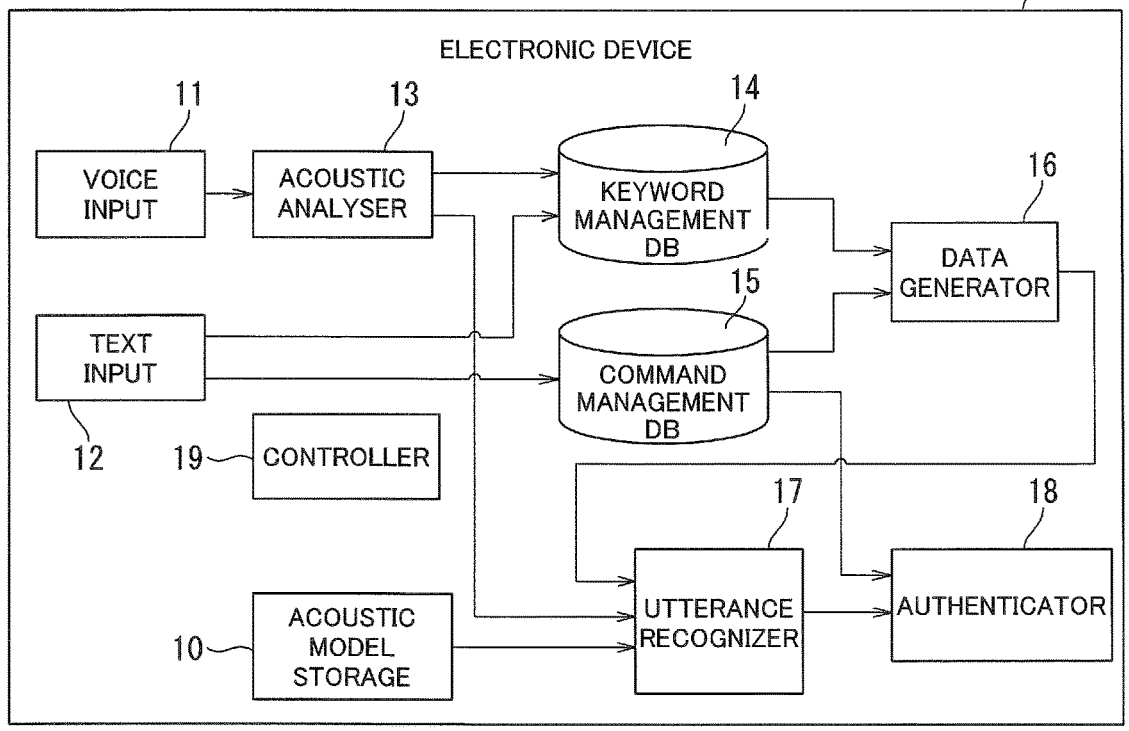
FIG. 1 is a block diagram illustrating a schematic configuration of an electronic device 1 according to an embodiment of the present invention.

As illustrated in FIG. 1, the electronic device 1 includes a voice input 11 to which an utterance of a registrant who registers a registered keyword (details will be described later) and an utterance of a user who uses the electronic device 1 are input, and a text input 12 for inputting characters. The voice input 11 is configured with, for example, a microphone. The text input 12 is configured with, for example, a keyboard, a touch panel provided on a display screen, and the like.

The electronic device 1 includes an acoustic analyser 13 that generates first time-series data and second time-series data, the first time-series data being configured with acoustic feature amounts obtained by analyzing an utterance of a registrant that is input from the voice input 11, and the second time-series data being configured with acoustic feature amounts obtained by analyzing an utterance of a user that is input from the voice input 11. A detailed configuration of the acoustic analyser 13 will be described later.

The electronic device 1 includes a keyword management database (an example of a keyword storage) 14 in which identification information for identifying a registrant and a registered keyword based on an utterance of the registrant are stored in association with each other. The keyword management database (hereinafter, abbreviated to "DB") 14 is connected to the acoustic analyser 13 and the text input 12. In the keyword management DB 14, a registered keyword based on an utterance of a registrant is input from the acoustic analyser 13, and identification information for identifying a registrant is input from the text input 12. That is, the keyword management DB 14 is configured to store time-series data (an example of the first time-series data) including a registered keyword based on an utterance of a registrant that is input from the acoustic analyser 13, as a registered keyword. A database structure of the keyword management DB 14 will be described later.

The electronic device 1 includes a command management DB (an example of a command storage) 15 in which a command for specifying an operation content of the electronic device 1 and a required authentication score to be used for determining whether or not to execute an operation specified by the command are stored in association with each other. In the command management DB 15, a plurality of commands for specifying operation contents of the electronic device 1 is stored in advance. In addition, the command management DB 15 is configured to store a command which is input from the text input 12. A database structure of the command management DB 15 will be described later.

The electronic device 1 includes a data generator 16 that generates grammar data (details will be described later) including a registered keyword acquired from the keyword management DB 14 and a command acquired from the command management DB 15. The data generator 16 acquires a registered keyword which is analyzed and extracted and is converted into the time-series data by the acoustic analyser 13. A detailed configuration of the data generator 16 will be described later.

The electronic device 1 includes an utterance recognizer 17 that matches the grammar data generated by the data generator 16 and extracted data which is extracted from the utterance of the user of the electronic device 1, and that acquires a recognized authentication score indicating a matching degree between the registered keyword included in the grammar data and a part of the extracted data and a recognized command which is recognized from at least a part of a remaining part of the extracted data. The extracted data which is extracted from the utterance of the user is time-series data (second time-series data) of acoustic feature amounts obtained by analyzing the utterance of the user by the acoustic analyser 13. That is, the utterance recognizer 17 acquires a recognized authentication score and a recognized command by using the second time-series data which is input from the acoustic analyser 13 as the extracted data. The recognized command acquired by the utterance recognizer 17 is a command in which an operation content requested by the user to the electronic device 1 is specified. In addition, the recognized authentication score acquired by the utterance recognizer 17 is a score for determining whether or not to allow an execution of the operation requested by the user to the electronic device 1. A detailed configuration of the utterance recognizer 17 will be described later.

The electronic device 1 includes an authenticator 18. In a case where the required authentication score which is associated with the command determined to be the same as the recognized command acquired by the utterance recognizer 17 (hereinafter, also referred to as "acquired command") is equal to or lower than the recognized authentication score acquired by the utterance recognizer 17, the authenticator 18 determines that the command is recognized, and in a case where the required authentication score is higher than the recognized authentication score, the authenticator 18 determines that the command is not recognized. The required authentication score used for comparison with the recognized authentication score acquired by the utterance recognizer 17 is a score indicating a matching degree of a user that is required for executing an operation requested by the user to the electronic device 1. A detailed configuration of the authenticator 18 will be described later.

The electronic device 1 includes an acoustic model storage 10 that stores acoustic model data to be used when extracting a command included in time-series data based on a voice which is input from the voice input 11. The acoustic model storage 10 is configured with, for example, a non-volatile memory. The acoustic model storage 10 may be configured with a random access memory capable of writing acoustic model data from outside the electronic device 1.

The electronic device 1 includes a controller 19 that overall controls the voice input 11, the text input 12, the keyword management DB 14, the command management DB 15, the data generator 16, the utterance recognizer 17, the authenticator 18, the acoustic model storage 10, and other components (not illustrated) of the electronic device 1.

Figure 2:
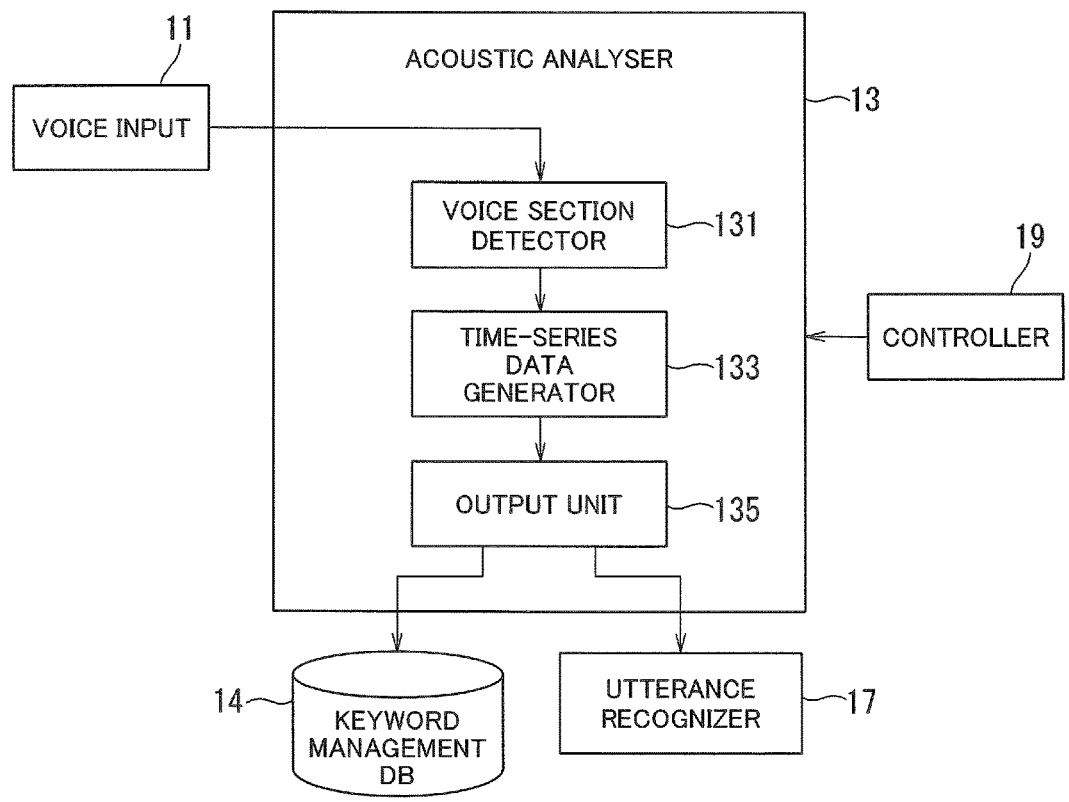
FIG. 2 is a block diagram illustrating a schematic configuration of an acoustic analyser 13 provided in the electronic device 1 according to an embodiment of the present invention.

Next, a detailed configuration of the acoustic analyser 13 will be described with reference to FIG. 2. In FIG. 2, for easy understanding, the voice input 11, the keyword management DB 14, the utterance recognizer 17, and the controller 19 which are provided in the electronic device 1 and are connected to the acoustic analyser 13 are also illustrated.

As illustrated in FIG. 2, the acoustic analyser 13 includes a voice section detector 131 that is connected to the voice input 11 and detects a voice section of a voice which is input from the voice input 11. The voice section detector 131 detects a plurality of voice sections of a voice which is input from the voice input 11 based an utterance of a registrant who registers a registered keyword or a user who uses the electronic device 1. The voice section detector 131 detects voice sections until a voice end is detected by a voice section detection algorithm.

The acoustic analyser 13 includes a time-series data generator 133 that generates time-series data of acoustic feature amounts extracted from the voice sections which are output from the voice section detector 131. The time-series data generator 133 extracts acoustic feature amounts of each of the plurality of voice sections output from the voice section detector 131. The time-series data generator 133 extracts acoustic feature amounts such as Mel-frequency cepstral coefficient (MFCC) from the voice sections. In the present embodiment, types of the acoustic feature amounts are not particularly limited. As will be described in detail later, the acoustic feature amount extracted by the time-series data generator 133 is required to be matched with the acoustic feature amount to be used for recognition by the utterance recognizer 17. Therefore, preferably, the time-series data generator 133 in the present embodiment extracts acoustic feature amounts from a keyword voice which is input under a silent state without noise.

The acoustic analyser 13 includes an output 135 that outputs the time-series data generated by the time-series data generator 133. Under the control of the controller 19, the output 135 outputs the time-series data (an example of the first time-series data) based on the utterance of the registrant who registers the registered keyword to the keyword management DB 14, and outputs the time-series data (an example of the second time-series data) based on the utterance of the user of the electronic device 1 to the utterance recognizer 17.

The acoustic analyser 13 may be configured to use the same acoustic feature amount parameter to extract the registered keyword and the command from the utterance of the user. In this case, an acoustic feature amount parameter for extracting the registered keyword from the utterance of the user and an acoustic feature amount parameter for extracting the command from the utterance of the user may be commonly used, and thus, a configuration of the acoustic analyser 13 is simplified. In addition, the acoustic analyser 13 may be configured to use different acoustic feature amount parameters to extract the registered keyword and the command from the utterance of the user. In this case, an optimized acoustic feature amount parameter for extracting the registered keyword from the utterance of the user may be used, and an optimized acoustic feature amount parameter for extracting the command from the utterance of the user may be used. Therefore, it is possible to extract the registered keyword and the command with high precision from the utterance of the user.

Next, a database structure of the keyword management DB 14 will be described with reference to FIG. 3 while referring to FIGS. 1 and 2. Although FIG. 3 illustrates a state in which four pairs of registrant identification information and acoustic feature amount time-series data are stored in the keyword management DB 14, the keyword management DB 14 is configured to store five or more pairs of registrant identification information and acoustic feature amount time-series data.

As illustrated in FIG. 3, the keyword management DB 14 has a database structure in which "user ID" and "feature amount time-series" may be stored in association with each other. "user ID" indicates identification information for identifying a registrant who registers a registered keyword. "feature amount time-series" indicates acoustic feature amount time-series data which is input from the acoustic analyser 13.

When a voice is input to the voice input 11 after registrant identification information is input from the text input 12, the controller 19 (refer to FIG. 1) determines that keyword registration is executed by a registrant, and performs a control such that the acoustic analyser 13 transmits the generated acoustic feature amount time-series data to the keyword management DB 14. The keyword management DB 14 stores the registrant identification information that is input from the text input 12 and the acoustic feature amount time-series data that is input from the acoustic analyser 13 in association with each other.

The keyword management DB 14 stores the input registrant identification information in a storage area of "user ID", and stores the acoustic feature amount time-series data which is input almost at the same time as the identification information in a storage area associated with the storage area in which the identification information is stored, among storage areas of "feature amount time-series". Thereby, the keyword management DB 14 may manage the registrant identification information and the acoustic feature amount time-series data which are input almost at the same time in association with each other.

In FIG. 3, numerals of the identification information (1, 2, and 3 in FIG. 3) indicate differences of registrants, alphabets added to the time-series data indicate differences in voice, and numerals added to the time-series data indicate differences of speakers. Thus, in FIG. 3, in a first-row storage area and a second-row storage area of the keyword management DB 14, different registered keywords (time-series data A and time-series data B) which are registered by the same registrant (identification information "1") are stored. In addition, in a third-row storage area of the keyword management DB 14, a registered keyword, which is registered by a registrant (identification information "2") different from the registrant in the first row and the second row and is the same as the first-row registered keyword (time-series data A), is stored. In addition, in a fourth-row storage area of the keyword management DB 14, a registered keyword, which is registered by a registrant (identification information "3") different from the registrants in the first row to the third row and is the same as the first-row registered keyword (time-series data A), is stored. Since voice quality is different for each registrant, even when the registered keywords are the same, pieces of the acoustic feature amount time-series data are different from each other. Therefore, the time-series data A1, the time-series data A2, and the time-series data A3 illustrated in FIG. 3 are regarded as different data from each other even though each data includes the same keyword.

Specifically, the keyword management DB 14 respectively stores the registrant identification information "1" and the acoustic feature amount time-series data "time-series data A1" which are input almost at the same time, in first-row storage areas of "user ID" and "feature amount time-series". Thereby, the keyword management DB 14 manages the identification information "1" and the time-series data "time-series data A1" in correlation with each other.

In addition, the keyword management DB 14 respectively stores the registrant identification information "1" and the acoustic feature amount time-series data "time-series data B1" which are input almost at the same time, in second-row storage areas of "user ID" and "feature amount time-series". Thereby, the keyword management DB 14 manages the identification information "1" and the time-series data "time-series data B1" in correlation with each other.

In addition, the keyword management DB 14 respectively stores the registrant identification information "2" and the acoustic feature amount time-series data "time-series data A2" which are input almost at the same time, in third-row storage areas of "user ID" and "feature amount time-series". Thereby, the keyword management DB 14 manages the identification information "2" and the time-series data "time-series data A2" in correlation with each other.

In addition, the keyword management DB 14 respectively stores the registrant identification information "3" and the acoustic feature amount time-series data "time-series data A3" which are input almost at the same time, in fourth-row storage areas of "user ID" and "feature amount time-series". Thereby, the keyword management DB 14 manages the identification information "3" and the time-series data "time-series data A3" in correlation with each other.

Next, a database structure of the command management DB 15 will be described with reference to FIG. 4 while referring to FIG. 1. Although FIG. 4 illustrates a state in which four pairs of a command and a required authentication score are stored in the command management DB 15, the command management DB 15 is configured to store five or more pairs of a command and a required authentication score.

As illustrated in FIG. 4, the command management DB 15 has a database structure in which "command" and "required authentication score" may be stored in association with each other. "command" indicates an operation content to be executed by the electronic device 1. "required authentication score" indicates an authentication score of a user that is required for causing the electronic device 1 to execute an operation related to a command. That is, the command management DB 15 manages commands related to operations of the electronic device 1 and required authentication scores of a user that are for executing the operations, in correlation with each other. Therefore, the electronic device 1 has a speaker authentication function and a speaker identification function in control based on a voice recognition command, and thus it is possible to differently control security levels for starting the operations related to the commands for each command.

In the command management DB 15, commands related to operations of the electronic device 1 and required authentication scores are stored in advance in correlation with each other. In an example illustrated in FIG. 4, in the command management DB 15, a required authentication score "20" is stored in correlation with a command "illumination lighting", a required authentication score "80" is stored in correlation with a command "received call history", a required authentication score "80" is stored in correlation with a command "voice memo play", and a required authentication score "40" is stored in correlation with a command "music play". "Illumination lighting" indicates an operation of lighting an illumination device. "received call history" indicates an operation of displaying a received call history list on a display device (not illustrated) provided in the electronic device 1. "voice memo play" indicates an operation of playing a voice memo stored in the electronic device 1. "music play" indicates an operation of playing a music stored in the electronic device 1 or an operation of causing a music player to play a music. The larger the numerical value stored as the required authentication score, the higher the security level for executing an operation related to a command. Therefore, in the command management DB 15, a required authentication score of an operation in which personal information is easily included (for example, "received call history" or "voice memo play") is set to be higher than that of an operation in which personal information is not easily included (for example, "illumination lighting") such that a recognition level of personal authentication becomes high. The numerical value of the required authentication score is a comparative numerical value to be compared with the authentication recognition score acquired by the utterance recognizer 17 (refer to FIG. 1).

Figure 5:
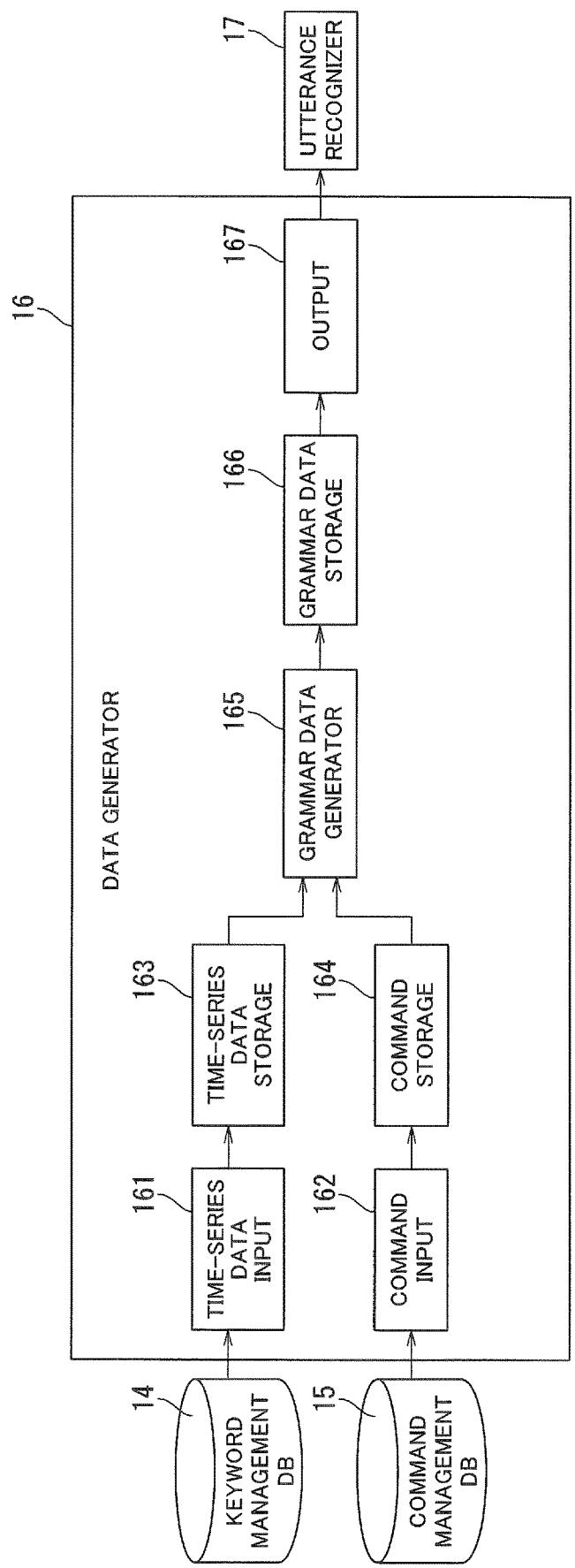
FIG. 5 is a block diagram illustrating a schematic configuration of a data generator 16 provided in the electronic device 1 according to an embodiment of the present invention.

Next, a specific configuration of the data generator 16 will be described with reference to FIGS. 5 and 6. In FIG. 5, for easy understanding, the keyword management DB 14, the command management DB 15, and the utterance recognizer 17 which are provided in the electronic device 1 and are connected to the data generator 16 are also illustrated.

As illustrated in FIG. 5, the data generator 16 includes a time-series data input 161 to which the acoustic feature amount time-series data output from the keyword management DB 14 is input, and a command input 162 to which the command output from the command management DB 15 is input. In the time-series data input 161, the identification information of the registrant, which is stored in the keyword management DB 14 in association with the time-series data, is also input together with the time-series data. In the time-series data input 161, all the identification information and all the time-series data which are stored in the keyword management DB 14 are subsequently input in a state of being associated with each other. Similarly, in the command input 162, all the commands stored in the command management DB 15 are subsequently input.

The data generator 16 includes a time-series data storage 163 that temporarily stores all the time-series data and all the identification information which are input in the time-series data input 161 in a state of being associated with each other, and a command storage 164 that temporarily stores all the commands which are input in the command input 162.

The data generator 16 includes a grammar data generator 165 that generates grammar data by linking the identification information and the time-series data stored in the time-series data storage 163 and the command stored in the command storage 164, and a grammar data storage 166 that temporarily stores the grammar data generated by the grammar data generator 165.

The grammar data generator 165 generates grammar data by linking all combinations of the time-series data and the identification information which are stored in the time-series data storage 163 and the command stored in the command storage 164. The grammar data generator 165 converts the acoustic feature amount time-series data which is input from the time-series data storage 163 into a format suitable for an algorithm of performing speaker matching processing based on dynamic time warping (DTW). In addition, the grammar data generator 165 converts the command which is input from the command storage 164 into a format suitable for matching processing based on a statistical model for voice recognition (for example, a hidden Markov model (HMM) for voice recognition of unspecified speakers). The acoustic feature amount time-series data may be converted into a format other than the format suitable for an algorithm of performing speaker matching processing based on dynamic time warping, and the command may be converted into a format of a statistical model other than the hidden Markov model.

The grammar data generator 165 outputs the generated grammar data to the grammar data storage 166. The grammar data storage 166 adds a number to the grammar data which is input from the grammar data generator 165, and stores the number-added grammar data.

Here, a database structure of the grammar data storage 166 and a data structure of the grammar data stored in the grammar data storage 166 will be described with reference to FIG. 6. FIG. 6 illustrates a state in which 16 pieces of grammar data that are generated by combining four pairs of the identification information and the time-series data illustrated in FIG. 3 and the four commands illustrated in FIG. 4 are stored.

As illustrated in FIG. 6, the grammar data storage 166 has a database structure in which "number" and "grammar data" may be stored in correlation with each other. "number" indicates a number assigned in time-series order of data input from the grammar data generator 165. In addition, "number" indicates an order in which the grammar data storage 166 outputs the grammar data to an output 167 to be described. "grammar data" indicates the grammar data which is input from the grammar data generator 165 and is stored in the grammar data storage 166.

As illustrated in FIG. 6, the grammar data has a data structure, the data structure being configured with a word group including the identification information of the registrant, a word group including the acoustic feature amount time-series data of the registered keyword which is registered by the registrant, as a template, and a word group including the command linked to the identification information and the time-series data. The grammar data represents linking of words used for voice recognition. In the grammar data, the acoustic feature amount time-series data with a format suitable for an algorithm of performing speaker matching processing and the command with a format suitable for matching processing based on a statistical model for voice recognition are linked to each other. Since the identification information is not information to be matched with voice data in the utterance recognizer 17 (refer to FIG. 1), the identification information is linked to the time-series data and the command, for example, in a text format.

In a case where the keyword management DB 14 stores a plurality of first pairs as pairs of the identification information and the time-series data including the registered keyword which are associated with each other, and where the command management DB 15 stores a plurality of second pairs as pairs of the command and the required authentication score, the data generator 16 generates a plurality of pieces of grammar data including different combinations of the first pairs and the second pairs. In the present embodiment, the keyword management DB 14 stores four first pairs of "1" and "time-series data A1", "1" and "time-series data B1", "2" and "time-series data A2", and "3" and "time-series data A3", as pairs of "user ID" and "feature amount time-series" (refer to FIG. 3). In addition, the command management DB 15 stores four second pairs of "illumination lighting" and "20", "received call history" and "80", "voice memo play" and "80", and "music play" and "40", as pairs of the command and the required authentication score (refer to FIG. 4). Therefore, the grammar data generator 165 of the data generator 16 generates the plurality of pieces of grammar data including different combinations of the first pairs and the second pairs.

More specifically, pieces of grammar data are stored in correlation with numbers "1" to "4", the pieces of grammar data being configured by linking the identification information "1" and the time-series data "time-series data A1" stored in the keyword management DB 14 and each of the four commands stored in the command management DB 15. The grammar data "1/time-series data A1/illumination lighting" correlated with a number "1" is configured by linking the identification number "1", the time-series data "time-series data A1", and the command "illumination lighting". Here, in the grammar data "1/time-series data A1/illumination lighting", a part represented by "1" corresponds to the word group including the identification information of the registrant, a part represented by "time-series data A1" corresponds to the word group including the acoustic feature amount time-series data of the registered keyword which is registered by the registrant, as a template, and a part represented by "illumination lighting" corresponds to the word group including the command linked to the identification information and the time-series data.

In addition, the grammar data "1/time-series data A1/received call history" correlated with a number "2" is configured by linking the identification number "1", the time-series data "time-series data A1", and the command "received call history". The grammar data "1/time-series data A1/voice memo play" correlated with a number "3" is configured by linking the identification number "1", the time-series data "time-series data A1", and the command "voice memo play". The grammar data "1/time-series data A1/music play" correlated with a number "4" is configured by linking the identification number "1", the time-series data "time-series data A1", and the command "music play".

In addition, pieces of grammar data such as "1/time-series data B1/illumination lighting" are stored in correlation with numbers "5" to "8", the pieces of grammar data being configured by linking the identification information "1" and the time-series data "time-series data B1" stored in the keyword management DB 14 and each of the four commands stored in the command management DB 15. In addition, pieces of grammar data such as "2/time-series data A2/illumination lighting" are stored in correlation with numbers "9" to "12", the pieces of grammar data being configured by linking the identification information "2" and the time-series data "time-series data A2" stored in the keyword management DB 14 and each of the four commands stored in the command management DB 15. In addition, pieces of grammar data such as "3/time-series data A3/illumination lighting" are stored in correlation with numbers "13" to "16", the pieces of grammar data being configured by linking the identification information "3" and the time-series data "time-series data A3" stored in the keyword management DB 14 and each of the four commands stored in the command management DB 15.

In this manner, the grammar data generator 165 generates the grammar data by linking the command to the end of the time-series data. The time-series data included in the grammar data includes the registered keyword. Therefore, the data generator 16 generates the grammar data by linking the command to the end of the registered keyword. The registered keyword corresponds to a word that the user calls the electronic device 1 to activate a predetermined function (for example, "illumination lighting" or "music play") of the electronic device 1 as a household robot. In addition, the command corresponds to a function to be activated in the electronic device 1. For this reason, in order to activate a predetermined function of the electronic device 1, in general, a user first calls the electronic device 1 and utters a function of activating the electronic device 1. Since the grammar data has a configuration in which the command is linked to the end of the registered keyword, the grammar data matches with a flow of a series of utterances of a user. Thus, it is possible to reduce a load of matching processing in the utterance recognizer 17 to be described.

Returning to FIG. 5, the data generator 16 includes an output 167 that outputs the grammar data which is input from the grammar data storage 166 to the utterance recognizer 17.

Figure 7:
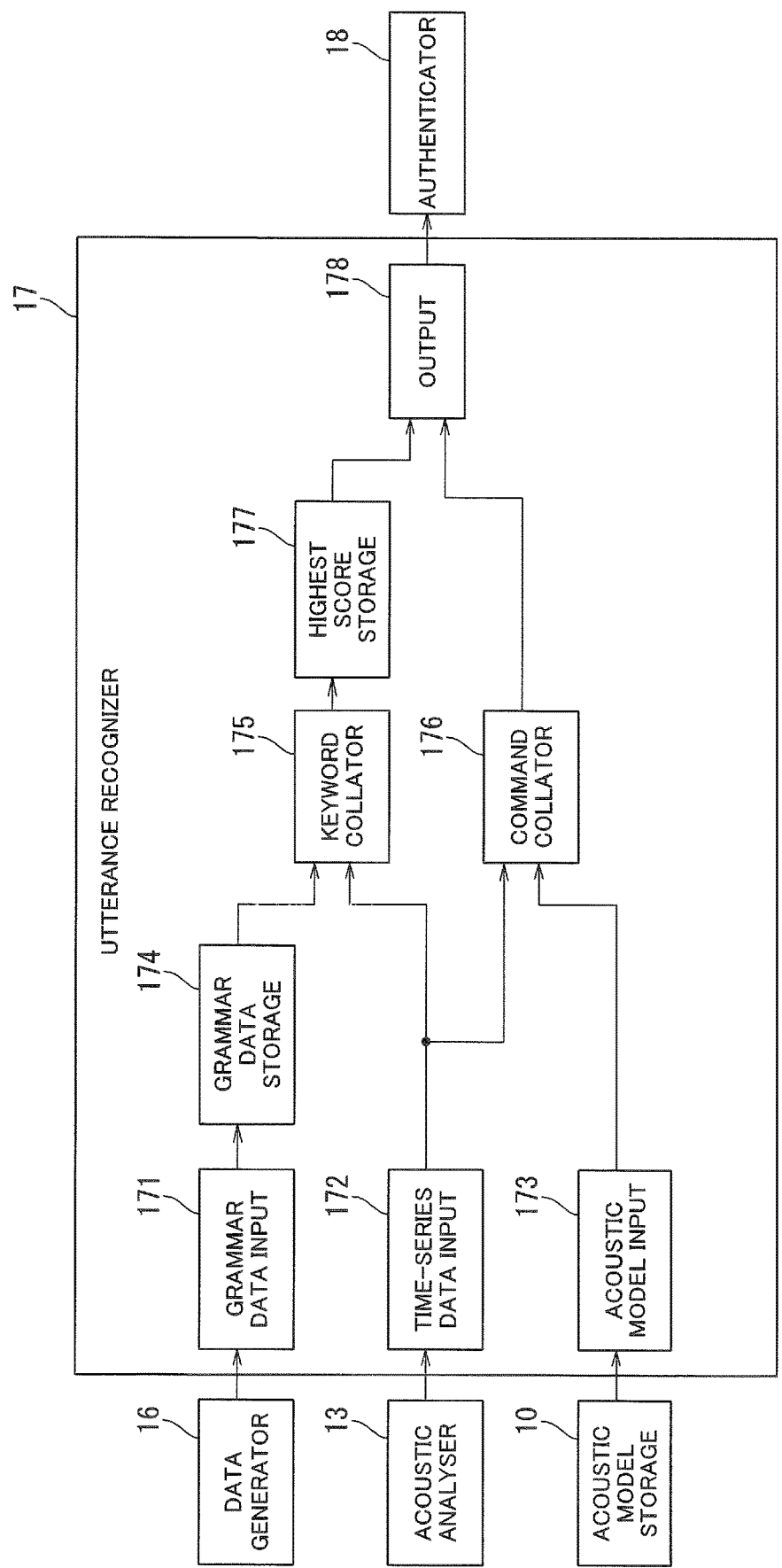
FIG. 7 is a block diagram illustrating a schematic configuration of an utterance recognizer 17 provided in the electronic device 1 according to an embodiment of the present invention.

Next, a specific configuration of the utterance recognizer 17 will be described with reference to FIG. 7. In FIG. 7, for easy understanding, the data generator 16, the acoustic analyser 13, the acoustic model storage 10, and the authenticator 18 which are provided in the electronic device 1 and are connected to the utterance recognizer 17 are also illustrated.

As illustrated in FIG. 7, the utterance recognizer 17 includes a grammar data input 171 to which the grammar data that is output from the data generator 16 is input, a time-series data input 172 to which the acoustic feature amount time-series data that is output from the acoustic analyser 13 is input, and an acoustic model input 173 to which the acoustic model that is read from the acoustic model storage 10 is input.

In addition, the utterance recognizer 17 includes a grammar data storage 174 that temporarily stores the grammar data which is input from the grammar data input 171. The grammar data storage 174 has the same database structure as that of the grammar data storage 166 provided in the data generator 16. All the grammar data stored in the grammar data storage 166 is input into the grammar data input 171, the grammar data storage 174 finally stores all the grammar data which is the same as all the grammar data stored in the grammar data storage 166.

The utterance recognizer 17 includes a keyword collator 175 that matches the acoustic feature amount time-series data of the registered keyword (hereinafter, may be referred to as "registered time-series data") included in the grammar data which is input from the grammar data storage 174 and the acoustic feature amount time-series data which is input from the time-series data input 172 (hereinafter, may be referred to as "matching time-series data").

The keyword collator 175 sets first grammar data which is input from the grammar data storage 174 and the time-series data which is input from the time-series data input 172. The keyword collator 175 calculates a matching degree between the registered time-series data and the matching time-series data which are set, using distance calculation or the like. The keyword collator 175 calculates a matching degree between the registered time-series data and the matching time-series data until a voice end is detected by a voice section detection algorithm. The keyword collator 175 acquires the calculated matching degree, as a recognized authentication score indicating a matching degree between the registered keyword included in the grammar data and a part of the matching time-series data (an example of a part of the extracted data which is extracted from the utterance of user). The keyword collator 175 acquires recognized authentication scores with respect to each grammar data by matching all the grammar data stored in the grammar data storage 174 and the matching time-series data.

As illustrated in FIG. 7, the utterance recognizer 17 includes a highest score storage 177 that stores recognized registered-keyword information which is input from the keyword collator 175. In the recognized registered-keyword information, the recognized authentication score which is acquired by the utterance recognizer 17, and the identification information of the registrant which is included in the grammar data from which the recognized authentication score is acquired are included in correlation with each other. When acquiring the recognized registered-keyword information, the keyword collator 175 sequentially outputs the recognized registered-keyword information including the recognized authentication score which is acquired, to the highest score storage 177.

When the recognized registered-keyword information is input from the keyword collator 175, the highest score storage 177 compares the recognized authentication score included in the recognized registered-keyword information which is input with a recognized authentication score included in recognized registered-keyword information which is already stored. When it is determined that the recognized authentication score which is input is equal to or higher than the recognized authentication score which is already stored, the highest score storage 177 determines that the recognized authentication score which is input corresponds to a highest score, and stores the recognized registered-keyword information which is input. On the other hand, when it is determined that the recognized authentication score which is input is lower than the recognized authentication score which is already stored, the highest score storage 177 discards the recognized registered-keyword information which is input, and maintains the recognized authentication score which is already stored, as a highest score. In this manner, the highest score storage 177 provided in the utterance recognizer 17 selects and stores, among the plurality of pieces of grammar data, the grammar data including the command determined to be the same as the recognized command and having the highest value of the recognized authentication score which is acquired.

The electronic device 1 according to the present embodiment generates the grammar data for each of all the keywords stored in the keyword management DB 14, compares all the generated grammar data with the time-series data based on the utterance of the user, and selects and stores the recognized authentication score having the highest score. Thereby, the electronic device 1 is capable of specifying the registrant associated with the recognized authentication score having the highest score. In this manner, the electronic device 1 specifies a user who intends to activate a predetermined function of the electronic device 1 by speaker identification using all the keywords stored in the keyword management DB 14.

As illustrated in FIG. 7, the utterance recognizer 17 includes a command collator 176 that matches the command included in the grammar data which is input from the grammar data storage 174 (hereinafter, may be referred to as "stored command") and the acoustic feature amount time-series data which is input from the time-series data input 172.

The command collator 176 sets the time-series data which is input from the time-series data input 172. In addition, in order to perform command recognition as unspecified speaker voice recognition, the command being included in the matching time-series data, the command collator 176 reads required acoustic model data from the acoustic model storage 10, and sets the read acoustic model data. The command collator 176 reads and sets acoustic model data which is required for recognizing, for example, four commands ("illumination lighting", "received call history", "voice memo play", and "music play") stored in the command management DB 15 from the acoustic model storage 10.

The command collator 176 extracts the command included in the matching time-series data, using the set acoustic model data. That is, the utterance recognizer 17 determines a type of the command included in at least a part of the matching time-series data (an example of at least a part of the remaining part of the extracted data), using the acoustic model data. Here, the type of the command means a type of the command stored in the command management DB 15 (in the present example, "illumination lighting", "received call history", "voice memo play", and "music play"). The command collator 176 executes command extraction processing until a voice end is detected by a voice section detection algorithm. The command collator 176 acquires the extracted command, as a recognized command which is recognized from at least a part of the remaining part of the extracted data which is extracted from the utterance of the user.

As illustrated in FIG. 7, the utterance recognizer 17 includes an output 178 that outputs the recognized registered-keyword information which is input from the highest score storage 177 and the recognized command which is input from the command collator 176 to the authenticator 18.

Figures 8, 9:
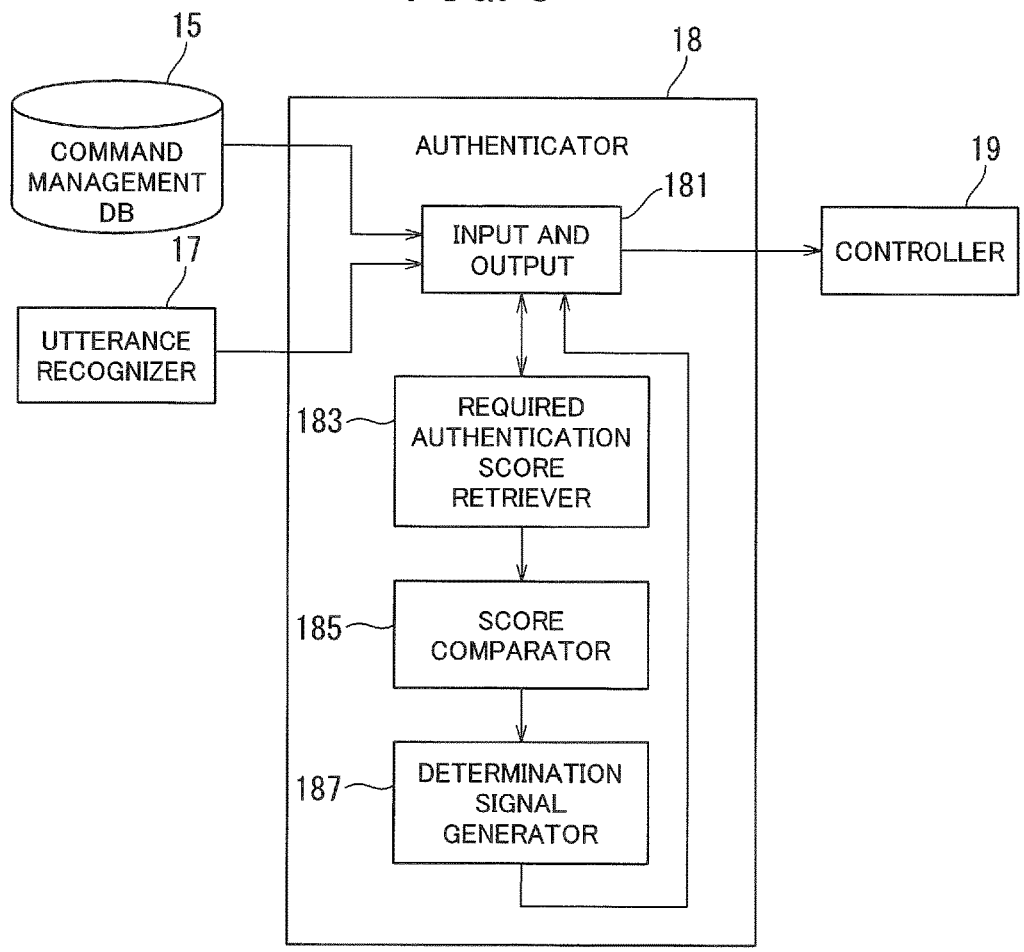
FIG. 8 is a block diagram illustrating a schematic configuration of an authenticator 18 provided in the electronic device 1 according to an embodiment of the present invention.
FIG. 9 is a diagram illustrating another database structure of the command management DB 15 provided in the electronic device 1 according to an embodiment of the present invention.

Next, a specific configuration of the authenticator 18 will be described with reference to FIG. 8. In FIG. 8, for easy understanding, the command management DB 15, the utterance recognizer 17, and the controller 19 which are provided in the electronic device 1 and are connected to the authenticator 18 are also illustrated.

As illustrated in FIG. 8, the authenticator 18 includes an input and output 181 that inputs and outputs predetermined data between the command management DB 15, the utterance recognizer 17, and the controller 19, and a required authentication score retriever 183 that is connected to the input and output 181.

In the required authentication score retriever 183, the recognized registered-keyword information and the recognized command which are output from the utterance recognizer 17 are input via the input and output 181. The required authentication score retriever 183 acquires the required authentication score that is stored in the command management DB 15 in correlation with the recognized command which is input, via the input and output 181. When the recognized command which is input in the required authentication score retriever 183 is, for example, "illumination lighting", the required authentication score retriever 183 acquires the required authentication score "20" which is stored in the command management DB 15 in correlation with the command "illumination lighting" (refer to FIG. 4), via the input and output 181.

As illustrated in FIG. 8, the authenticator 18 includes a score comparator 185 that is connected to the required authentication score retriever 183. In the score comparator 185, the recognized registered-keyword information, the recognized command, and the required authentication score which are output from the required authentication score retriever 183 are input. The score comparator 185 compares the recognized authentication score included in the recognized registered-keyword information and the required authentication score. That is, the authenticator 18 compares the recognized authentication score and the required authentication score, the recognized authentication score being acquired from the grammar data which is selected by the highest score storage 177 of the utterance recognizer 17, and the required authentication score being associated with the recognized command which is determined to be the same as a command included in at least a part of the matching time-series data (an example of at least a part of the remaining part of the extracted data) by the command collator 176 of the utterance recognizer 17.

As illustrated in FIG. 8, the authenticator 18 includes a determination signal generator 187 connected to the score comparator 185. In the determination signal generator 187, a comparison result of the recognized authentication score and the required authentication score, and the recognized command are input from the score comparator 185. When it is determined that a comparison result indicating that the recognized authentication score is equal to or higher than the required authentication score is input from the score comparator 185, the determination signal generator 187 generates a determination signal indicating that the recognized command which is input from the score comparator 185 is recognized, and outputs the generated determination signal to the input and output 181. On the other hand, when it is determined that a comparison result indicating that the recognized authentication score is lower than the required authentication score is input from the score comparator 185, the determination signal generator 187 generates a determination signal indicating that the recognized command which is input from the score comparator 185 is not recognized, and outputs the generated determination signal to the input and output 181.

The determination signal which is output to the input and output 181 is input to the controller 19. When it is determined that a determination signal indicating that the recognized command is recognized is input, the controller 19 activates a component that executes an operation related to the recognized command. On the other hand, when it is determined that a determination signal indicating that the recognized command is not recognized is input, the controller 19 does not activate a component that executes an operation related to the recognized command. In addition, when it is determined that a determination signal is input regardless of whether or not the recognized command is recognized, the controller 19 deletes various data stored in the grammar data storage 174 and the highest score storage 177 of the utterance recognizer 17, and the time-series data storage 163, the command storage 164, and the grammar data storage 166 of the data generator 16.

In addition to the registered keyword acquired from the keyword management DB 14 and the command acquired from the command management DB 15, the grammar data may further include identification information for identifying a registrant (hereinafter, may be referred to as "registrant identification information"). In this case, the utterance recognizer 17 may acquire registrant identification information by matching the grammar data which is generated by the data generator 16 and the extracted data which is extracted from the utterance of the user of the electronic device 1.

Further, in a case where the grammar data includes identification information for identifying a registrant, the command management DB 15 may be configured to store a plurality of required authentication scores correlated with different registrant identification information in association with one command. As illustrated in FIG. 9, the command management DB 15 may have a database structure in which "command", "user ID", and "required authentication score" may be stored in association with each other. "command" and "required authentication score" illustrated in FIG. 9 indicate the same contents as "command" and "required authentication score" in the database structure of the command management DB 15 illustrated in FIG. 4. In addition, "user ID" illustrated in FIG. 9 indicates the registrant identification information.

As illustrated in FIG. 9, in the command management DB 15 according to the present example, in association with one command (for example, "music play") among a plurality of (in FIG. 9, four) commands stored in "command", a plurality of required authentication scores ("40" and "60") stored in "required authentication score" is stored in correlation with different registrant identification information ("1" and "2") stored in "user ID".

In this case, when the required authentication score correlated with the identification information acquired by the utterance recognizer 17, among the required authentication scores associated with the acquired command, is equal to or lower than the recognized authentication score acquired by the utterance recognizer 17, the authenticator 18 may determine that the acquired command is recognized. When the required authentication score is higher than the recognized authentication score, the authenticator 18 may determine that the acquired command is not recognized.

Next, a control method for the electronic device according to an embodiment of the present invention will be described with reference to FIG. 10 while referring to FIGS. 1, 3, and 4.

(Step S1)

Figure 10:
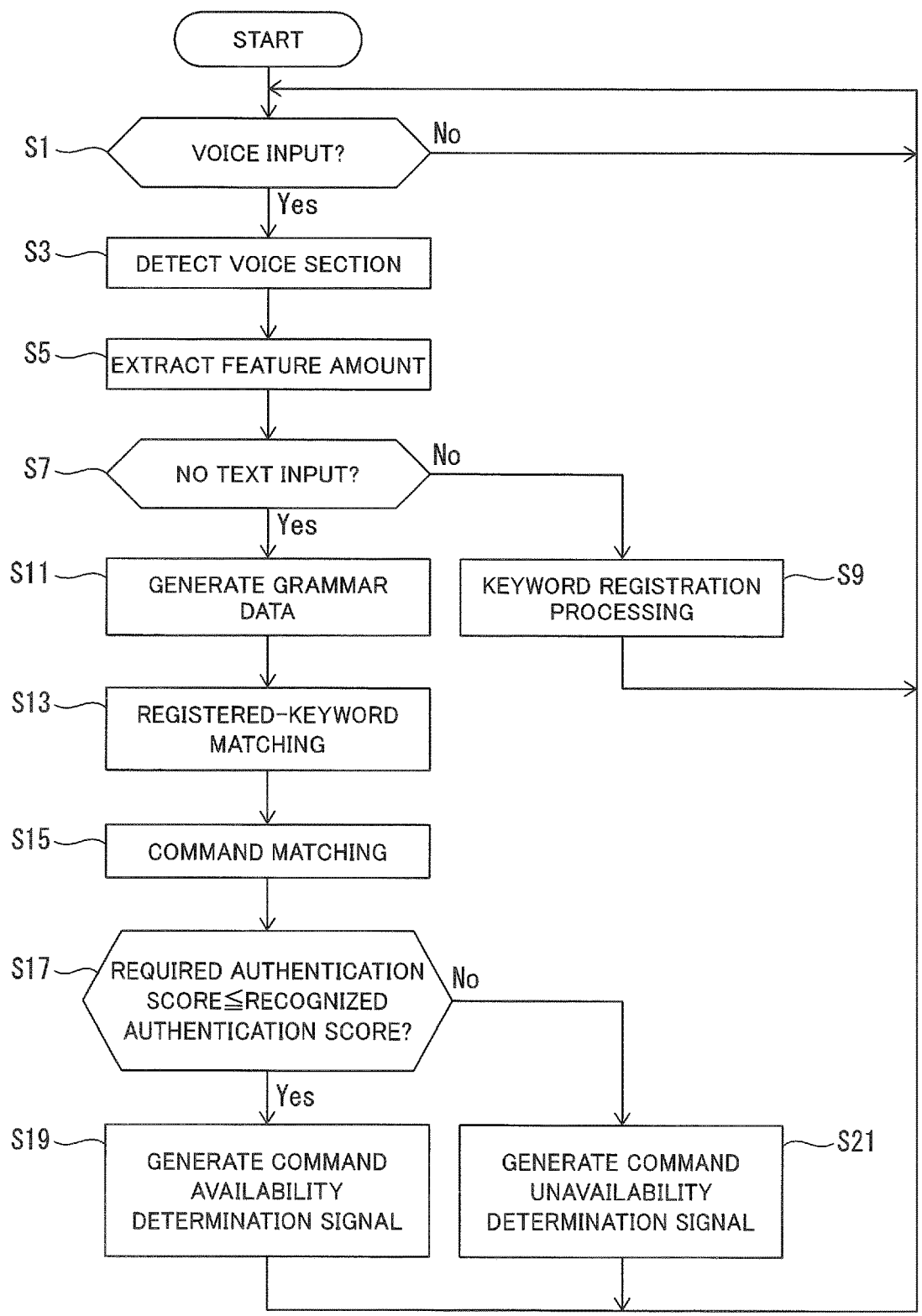
FIG. 10 is a flowchart illustrating an example of a flow of a control method for the electronic device 1 according to an embodiment of the present invention.

As illustrated in FIG. 10, in voice recognition processing of the electronic device 1, first, in step S1, the controller 19 provided in the electronic device 1 determines whether or not a voice is input to the voice input 11. When it is determined that a voice is input to the voice input 11, the process proceeds to step S3. On the other hand, the controller 19 repeatedly executes the processing of step S1 until it is determined that a voice is input to the voice input 11. In the present embodiment, the controller 19 monitors whether or not a voice is input to the voice input 11 even when the electronic device 1 is in a power-down state or even when the electronic device 1 is in a power-on state.

(Step S3)

In step S3, the controller 19 controls the acoustic analyser 13 to detect a voice section from the input voice. Thereby, the acoustic analyser 13 detects a voice section from the input voice. When the controller 19 determines that the acoustic analyser 13 ends voice section detection, the process proceeds to step S5.

(Step S5)

In step S5, the controller 19 controls the acoustic analyser 13 to extract an acoustic feature amount for each detected voice section and generate time-series data.

Thereby, the acoustic analyser 13 generates acoustic feature amount time-series data for each voice section. When the controller 19 determines that the acoustic analyser 13 generates acoustic feature amount time-series data for all the voice sections, the process proceeds to step S7.

(Step S7)

In step S7, the controller 19 determines whether or not a text is input to the text input 12 immediately before voice input or during voice input. When it is determined that a text is input, the process proceeds to step S9, and when it is determined that a text is not input, the process proceeds to step S11.

(Step S9)

In step S9, the controller 19 executes registration processing of a registered keyword, and the process returns to step S1. More specifically, when a text is input immediately before voice input or during voice input, the controller 19 determines that the voice in step S1 corresponds to a registered keyword, and controls the acoustic analyser 13 to output the generated acoustic feature amount time-series data to the keyword management DB. Thereby, the acoustic feature amount time-series data generated in step S5 and the text determined to be input in step S7 (that is, the identification information of the registrant) are stored in the keyword management DB 14 in association with each other.

(Step S11)

In step S11, the controller 19 controls the data generator 16 to generate grammar data. Thereby, the data generator 16 acquires data from the keyword management DB 14 and the command management DB 15, generates grammar data, and outputs all the generated grammar data to the utterance recognizer 17. When the controller 19 determines that the data generator 16 outputs all the grammar data to the utterance recognizer 17, the process proceeds to step S13.

(Step S13)

When a text is not input immediately before voice input or during voice input, the controller 19 determines that the voice in step S1 is an utterance of a user for activating a predetermined function of the electronic device 1, and in step S13, controls the utterance recognizer 17 to perform registered-keyword matching. Thereby, the utterance recognizer 17 acquires a recognized authentication score having a highest score by comparing the grammar data which is input and the time-series data, and outputs recognized registered-keyword information including the recognized authentication score which is acquired and the registrant identification information associated with the recognized authentication score to the authenticator 18. When the controller 19 determines that the utterance recognizer 17 outputs the recognized registered-keyword information to the authenticator 18, the process proceeds to step S15.

(Step S15)

In step S15, the controller 19 controls the utterance recognizer 17 to perform command matching. Thereby, the utterance recognizer 17 extracts a command from time-series data which is input, by using acoustic model data which is read from the acoustic model storage 10, and outputs the extracted command as a recognized command to the authenticator 18. When the controller 19 determines that the utterance recognizer 17 outputs the recognized command to the authenticator 18, the process proceeds to step S17.

(Step S17)

In step S17, the controller 19 controls the authenticator 18 to compare a recognized authentication score and a required authentication score. Thereby, the authenticator 18 acquires the required authentication score associated with the same command as the recognized command which is input, from the command management DB 15, and compares the required authentication score which is acquired and the recognized authentication score included in the recognized registered-keyword information which is input. When the authenticator 18 determines that the recognized authentication score is equal to or higher than the required authentication score, the process proceeds to step S19. When the authenticator 18 determines that the recognized authentication score is lower than the required authentication score, the process proceeds to step S21.

(Step S19)

In step S19, the authenticator 18 generates a "command availability determination signal" indicating that the recognized command is recognized, and outputs the generated signal to the controller 19. When receiving the command availability determination signal, the controller 19 deletes various data stored in the grammar data storage 174 and the highest score storage 177 of the utterance recognizer 17, and the time-series data storage 163, the command storage 164, and the grammar data storage 166 of the data generator 16, and the process returns to step S1. Further, the controller 19 activates a component that executes an operation related to the recognized command.

(Step S21)

In step S21, the authenticator 18 generates a "command unavailability determination signal" indicating that the recognized command is not recognized, and outputs the generated signal to the controller 19. When receiving the command unavailability determination signal, the controller 19 deletes various data stored in the grammar data storage 174 and the highest score storage 177 of the utterance recognizer 17, and the time-series data storage 163, the command storage 164, and the grammar data storage 166 of the data generator 16, and the process returns to step S1. The controller 19 does not activate a component that executes an operation related to the recognized command. When receiving the command unavailability determination signal, the controller 19 may control the electronic device 1 to notify that the command is not accepted.

Next, a control program for the electronic device according to an embodiment of the present invention will be described.

A configuration of a part of the electronic device 1 according to the present embodiment may be implemented by a computer program. For example, functions of the acoustic analyser 13, the keyword management DB 14, the command management DB 15, the data generator 16, the utterance recognizer 17, the authenticator 18, the controller 19, and the acoustic model storage 10 may be realized by a control program of the electronic device. Accordingly, some or all of the present invention may be incorporated in hardware or software (including firmware, resident software, a microcode, a state machine, a gate array, and the like). Further, the present invention may be implemented in a form of a computer program product on a computer-usable storage medium or a computer-readable storage medium (the computer including a central control processing unit provided in the electronic device), and in this case, a computer-usable program code or a computer-readable program code is incorporated into the medium. The computer-usable storage medium or the computer-readable storage medium is any medium capable of recording, storing, communicating, propagating, or transmitting a program to be used by a system, an apparatus, or/and a device of executing an instruction.

As described above, in the electronic device, the control method for the electronic device, and the control program for the electronic device according to the present embodiment, without unlocking user authentication for activating a predetermined function of the electronic device protected by user authentication, only by voice input of a user of the electronic device, it is possible to execute user authentication, and thus a desired function may be activated. Therefore, according to the electronic device, the control method for the electronic device, and the control program for the electronic device according to the present embodiment, it is possible to prevent an operation for activating a function protected by user authentication from becoming complicated.

In addition, in a case of using a text-independent voice print as described in PTL 1, when creating a text-independent voice print by a natural utterance during use so as to reduce a load of creating the text-independent voice print, there is a possibility that voice data from an utterance of a person other than the user is included. For this reason, in a text-independent voice print generated by such a manner, there is a problem that high authentication accuracy may not be obtained. Particularly, in the text-independent voice print generated by a natural utterance during use, since it is unclear how high authentication accuracy the voice print has, in a case where authentication accuracy for accessing a function of an electronic device is not obtained, there is a problem that a user of the electronic device is not allowed to do anything.

On the other hand, the electronic device 1 according to the present embodiment has a speaker authentication function and a speaker identification function in control of the electronic device 1 based on a voice recognition command. Therefore, the electronic device 1 according to the present embodiment does not need to use a text-independent voice print, and thus, there is no case where it is unclear how high authentication accuracy the voice print has, or there is no case where authentication accuracy for accessing a function of the electronic device 1 is not obtained. Accordingly, it is possible to improve authentication performance.

According to the electronic device 1 of the present embodiment, when a user continuously utters a voice keyword which is registered in advance by his/her voice and a voice recognition command which is prepared for operating the electronic device 1, it is possible to authenticate a user and to activate a function of the electronic device 1 by one continuous utterance. The voice recognition command is given by, for example, an unspecified speaker voice recognition technology, and in general, may be obtained by giving a pronunciation symbol to a command. By applying a similarity score condition for the voice keyword (required authentication score) to each voice recognition command according to a security level of an operation of the electronic device 1, it is possible to provide a security function in command recognition, and thus an operation may be performed simply and securely.

In general, in a case where a user registers his/her voice for speaker authentication, since it is necessary to accurately extract a feature amount of the voice of the user, a registration operation is performed under a quiet environment. Depending on which method is used, usually, the voice is registered by one utterance or several utterances, and a burden on the user is very small. On the other hand, at a time of speaker authentication, as a use environment (a reverberation environment, a noise environment, and the like), an utterance style, a voice quality change, and the like become different from those at a time of registration, a distance between the feature amounts increases, and as a result, similarity in speaker authentication decreases.

Depending on operation contents of the electronic device, there is a case where a user wants to use the electronic device in a noise environment even though a required security level is relatively low. When a low similarity score condition for keywords is applied to a voice recognition command corresponding to such a device operation, convenience in voice operation is improved. On the other hand, in a case where a relatively-high security level for user information management or the like is required, even though the electronic device is limited to be used in a relatively quiet environment, in some cases, there is a demand to secure security by applying a higher similarity score condition for keywords.

The electronic device 1 according to the present embodiment acquires a recognized authentication score of a user of the electronic device 1 by speaker identification instead of speaker authentication, and determines whether or not activation of a function can be started based on the recognized authentication score which is acquired and a required authentication score associated with a command related to a function for which the user wants to start activation. Thus, it is possible to secure security of the function. Therefore, according to the electronic device 1 of the present embodiment, it is possible to secure a stable security level for activation of a predetermined function without limitation by the use environment.

The present invention is not limited to the above embodiment, and various modifications may be made.

In the above embodiment, although the data generator 16 is configured to generate grammar data configured with registrant identification information, acoustic feature amount time-series data, and a command, the present invention is not limited to the configuration. For example, the data generator 16 may be configured to generate grammar data configured with a required authentication score associated with a command. In this case, the data generator 16 generates grammar data configured with registrant identification information, acoustic feature amount time-series data, a command, and a required authentication score. In addition, since the required authentication score is included in the grammar data, the utterance recognizer 17 may output the required authentication score associated with a recognized command, to the authenticator 18, together with the recognized command. Therefore, the authenticator 18 does not need to acquire the required authentication score from the command management DB 15, and thus it is possible to simplify comparison processing of the required authentication score and the recognized authentication score.

In the above embodiment, although the data generator 16 generates grammar data by linking a command to the end of the time-series data corresponding to a registered keyword, the present invention is not limited to the configuration. For example, the data generator 16 may generate grammar data by linking the time-series data corresponding to a registered keyword to the end of a command. Since the time-series data corresponding to a registered keyword and the command may be extracted from the grammar data, even in this case, the utterance recognizer 17 is able to acquire the recognized authentication score.

In the above embodiment, although one required authentication score is associated with one function, the present invention is not limited to the configuration. The command management DB 15 provided in the electronic device 1 may store a plurality of required authentication scores correlated with different registrant identification information in association with one command. In addition, the electronic device 1 may be configured to also register a required authentication score, for example, when a registrant registers a registered keyword.

For example, in a case where a plurality of users such as family members registers a voice keyword by calling a home robot as the electronic device 1 using a keyword, in the voice recognition method, it is possible to confirm which user utters the keyword and which voice command is recognized. In this case, an operation of the electronic device according to the same recognized command may be changed for each user. For example, in a case where both of a user 1 and a user 2 register "momo-chan" as a voice keyword and a command "dancing" is recognized, the user 1 and the user 2 can change dancing contents according to a previous history. In addition, in a case where a plurality of users registers voice keywords, required authentication scores associated with one function may be set depending on each user, and thus this is useful to reflect importance of security for each user to the required authentication scores.

REFERENCE SIGNS LIST

1: electronic device
10: acoustic model storage
11: voice input
12: text input
13: acoustic analyser
14: keyword management DB
15: command management DB
16: data generator
17: utterance recognizer
18: authenticator
19: controller
131: voice section detector
133: time-series data generator
135, 167, 178: output
161: time-series data input
162: command input
163: time-series data storage
164: command storage
165: grammar data generator
166, 174: grammar data storage
171: grammar data input
172: time-series data input
173: acoustic model input
175: keyword collator
176: command collator
177: highest score storage
181: input and output
183: required authentication score retriever
185: score comparator
187: determination signal generator

The invention claimed is:

1. An electronic device comprising:
a keyword storage configured to store identification information for identifying a registrant and a registered keyword based on an utterance of the registrant in association with each other;
a command storage configured to store a plurality of required authentication scores correlated with the identification information different from each other in association with one command, and store a command for specifying an operation content and the required authentication scores to be used for determining whether to execute an operation specified by the command in association with each other;
a data generator configured to generate grammar data including a registered keyword acquired from the keyword storage and a command acquired from the command storage;
an utterance recognizer configured to match the grammar data generated by the data generator and extracted data extracted from an utterance of a user, and acquire a recognized authentication score indicating a matching degree between the registered keyword included in the grammar data and a part of the extracted data and a recognized command recognized from at least a part of a remaining part of the extracted data;
an authenticator configured to determine, in a case where the required authentication score associated with the command determined to be the same as the recognized command acquired by the utterance recognizer is equal to or lower than the recognized authentication score acquired by the utterance recognizer, that the command is recognized and determine that the command is not recognized in a case where the required authentication score is higher than the recognized authentication score and output determination signal;
a controller configured to activates a component that executes an operation related to the recognized command when the determination signal indicating that the recognized command is recognized is input; and
an acoustic analyser configured to generate first time-series data and second time-series data, the first time-series data including acoustic feature amounts obtained by analyzing the utterance of the registrant, and the second time-series data including acoustic feature amounts obtained by analyzing the utterance of the user,
wherein the keyword storage stores the first time-series data input from the acoustic analyser, as the registered keyword, and
wherein the utterance recognizer acquires the recognized authentication score and the recognized command by using the second time-series data input from the acoustic analyser as the extracted data.

2. The electronic device according to claim 1, wherein the data generator generates the grammar data including the required authentication score associated with the command.

3. The electronic device according to claim 1, wherein the data generator generates the grammar data by linking the command to the end of the registered keyword.

4. The electronic device according to claim 1, wherein the acoustic analyser uses the same acoustic feature amount parameter to extract the registered keyword and the command from the utterance of the user.

5. The electronic device according to claim 1, wherein the acoustic analyser uses acoustic feature amount parameters different from each other to extract the registered keyword and the command from the utterance of the user.

6. The electronic device according to claim 1, wherein the utterance recognizer determines a type of the command included in at least a part of a remaining part of the extracted data by using an acoustic model.

7. The electronic device according to claim 1, wherein, in a case where the keyword storage stores a plurality of first pairs as pairs of the identification information and the registered keyword associated with each other and where the command storage stores a plurality of second pairs as pairs of the command and the required authentication score,
the data generator generates a plurality of pieces of grammar data including different combinations of the first pairs and the second pairs,
the utterance recognizer selects, among the plurality of pieces of grammar data, the grammar data including the command determined to be the same as the recognized command and having a highest value of the recognized authentication score which is acquired, and
the authenticator compares the recognized authentication score acquired from the selected grammar data and the required authentication score associated with the command determined to be the same as the command included in at least a part of the remaining part of the extracted data.

8. A control method for an electronic device, comprising:
causing a keyword storage to store identification information for identifying a registrant and a registered keyword based on an utterance of the registrant in association with each other;
causing a command storage to store a plurality of required authentication scores correlated with the identification information different from each other in association with one command, and store a command for specifying an operation content and the required authentication scores to be used for determining whether to execute an operation specified by the command in association with each other;

causing a data generator to generate grammar data including a registered keyword acquired from the keyword storage and a command acquired from the command storage;

causing an utterance recognizer to match the grammar data generated by the data generator and extracted data extracted from an utterance of a user, and acquire a recognized authentication score indicating a matching degree between the registered keyword included in the grammar data and a part of the extracted data and a recognized command recognized from at least a part of a remaining part of the extracted data;

causing an authenticator to determine, in a case where the required authentication score associated with the command determined to be the same as the recognized command acquired by the utterance recognizer is equal to or lower than the recognized authentication score acquired by the utterance recognizer, that the command is recognized and determine that the command is not recognized in a case where the required authentication score is higher than the recognized authentication score; and causing an acoustic analyser to generate first time-series data and second time-series data, the first time-series data including acoustic feature amounts obtained by analyzing the utterance of the registrant, and the second time-series data including acoustic feature amounts obtained by analyzing the utterance of the user, wherein the keyword storage stores the first time-series data input from the acoustic analyser, as the registered keyword, and wherein the utterance recognizer acquires the recognized authentication score and the recognized command by using the second time-series data input from the acoustic analyser as the extracted data.

9. A control program for an electronic device causing a computer to function as:

a keyword storage configured to store identification information for identifying a registrant and a registered keyword based on an utterance of the registrant in association with each other;

a command storage configured to store a plurality of required authentication scores correlated with the identification information different from each other in association with one command, and store a command for specifying an operation content and the required authentication scores to be used for determining whether to execute an operation specified by the command in association with each other;

a data generator configured to generate grammar data including a registered keyword acquired from the keyword storage and a command acquired from the command storage;

an utterance recognizer configured to match the grammar data generated by the data generator and extracted data extracted from an utterance of a user, and acquire a recognized authentication score indicating a matching degree between the registered keyword included in the grammar data and a part of the extracted data and a recognized command recognized from at least a part of a remaining part of the extracted data; and an authenticator configured to determine, in a case where the required authentication score associated with the command determined to be the same as the recognized command acquired by the utterance recognizer is equal to or lower than the recognized authentication score acquired by the utterance recognizer, that the command is recognized and determine that the command is not recognized in a case where the required authentication score is higher than the recognized authentication score; and causing an acoustic analyser to generate first time-series data and second time-series data, the first time-series data including acoustic feature amounts obtained by analyzing the utterance of the registrant, and the second time-series data including acoustic feature amounts obtained by analyzing the utterance of the user, wherein the keyword storage stores the first time-series data input from the acoustic analyser, as the registered keyword, and wherein the utterance recognizer acquires the recognized authentication score and the recognized command by using the second time-series data input from the acoustic analyser as the extracted data.

10. The electronic device according to claim 2, wherein the data generator generates the grammar data by linking the command to the end of the registered keyword.

11. The electronic device according to claim 2, wherein the acoustic analyser uses the same acoustic feature amount parameter to extract the registered keyword and the command from the utterance of the user.

12. The electronic device according to claim 2, wherein the acoustic analyser uses acoustic feature amount parameters different from each other to extract the registered keyword and the command from the utterance of the user.

13. The electronic device according to claim 2, wherein the utterance recognizer determines a type of the command included in at least a part of a remaining part of the extracted data by using an acoustic model.

14. The electronic device according to claim 2, wherein, in a case where the keyword storage stores a plurality of first pairs as pairs of the identification information and the registered keyword associated with each other and where the command storage unit stores a plurality of second pairs as pairs of the command and the required authentication score, the data generator generates a plurality of pieces of grammar data including different combinations of the first pairs and the second pairs, the utterance recognizer selects, among the plurality of pieces of grammar data, the grammar data including the command determined to be the same as the recognized command and having a highest value of the recognized authentication score which is acquired, and the authenticator compares the recognized authentication score acquired from the selected grammar data and the required authentication score associated with the command determined to be the same as the command included in at least a part of the remaining part of the extracted data.

15. The electronic device according to claim 3, wherein the acoustic analyser uses the same acoustic feature amount parameter to extract the registered keyword and the command from the utterance of the user.

16. The electronic device according to claim 3, wherein the acoustic analyser uses acoustic feature amount parameters different from each other to extract the registered keyword and the command from the utterance of the user.

17. The electronic device according to claim 3, wherein the utterance recognizer determines a type of the command included in at least a part of a remaining part of the extracted data by using an acoustic model.

* * * * *